(12) United States Patent
Moreno Gómez et al.

(10) Patent No.: US 7,326,345 B2
(45) Date of Patent: Feb. 5, 2008

(54) BIOREMEDIATION METHOD WHICH IS USED TO CONCENTRATE AND ELIMINATE RADIONUCLIDES IN RADIOACTIVE WATER

(75) Inventors: Diego Alejandro Moreno Gómez, Madrid (ES); Felipe Montero Ortego, Getafe (ES)

(73) Assignees: Universidad Politecnica de Madrid, Madrid (ES); Iberdrola Generacion SA, Bilbao (ES)

( * ) Notice: Subject to any disclaimer, the term of this patent is extended or adjusted under 35 U.S.C. 154(b) by 0 days.

(21) Appl. No.: 10/500,222

(22) PCT Filed: Dec. 31, 2002

(86) PCT No.: PCT/ES02/00624

§ 371 (c)(1),
(2), (4) Date: Feb. 15, 2005

(87) PCT Pub. No.: WO03/056572

PCT Pub. Date: Jul. 10, 2003

(65) Prior Publication Data

US 2005/0115896 A1 Jun. 2, 2005

(30) Foreign Application Priority Data

Jan. 2, 2002 (ES) ................. 200200006

(51) Int. Cl.
*C02F 3/00* (2006.01)
(52) U.S. Cl. ............ 210/617; 210/912; 435/262.5
(58) Field of Classification Search ............ 210/615, 210/616, 617, 618, 912; 435/262, 264, 262.5
See application file for complete search history.

(56) References Cited

U.S. PATENT DOCUMENTS

| 4,043,936 A | * | 8/1977 | Francis et al. ............... 210/617 |
| 4,545,909 A | * | 10/1985 | Atkinson et al. ............ 210/618 |
| 4,826,602 A | * | 5/1989 | Revis et al. ................. 210/615 |
| 4,861,519 A | * | 8/1989 | Tusa et al. ................... 435/262 |
| 5,393,426 A | * | 2/1995 | Raskin et al. ............... 435/262 |
| 5,422,268 A | * | 6/1995 | Rusin ....................... 435/262.5 |
| 5,447,629 A | | 9/1995 | Chaumont et al. |
| 5,487,834 A | | 1/1996 | Carman et al. |
| 5,833,855 A | * | 11/1998 | Saunders .................... 210/912 |
| 5,895,832 A | * | 4/1999 | Eccles ..................... 435/262.5 |
| 5,948,259 A | * | 9/1999 | Deguitre et al. ............ 210/615 |
| 6,080,572 A | * | 6/2000 | Hard et al. ............... 435/262.5 |
| 6,719,902 B1 | * | 4/2004 | Alvarez et al. ............. 210/617 |

FOREIGN PATENT DOCUMENTS

DE    44 33 413 A1    3/1996

OTHER PUBLICATIONS

"Review of Biotechnology Applications to Nuclear Waste Treatment" by Nicholas V. Ashley et al.; *J. Chem. Tech. Biotechnol.*; No. 49; pp. 381-394; c. 1990.

* cited by examiner

*Primary Examiner*—Christopher Upton
(74) *Attorney, Agent, or Firm*—Clark & Brody

(57) ABSTRACT

A method for concentrating and eliminating radionuclides from water from in nuclear pools based on the capacity of microorganisms when they are growing to retain radionuclides by forming biofilms on the colonized surfaces. The method of the invention utilizes the colonization of microorganisms in the water for the bioremediation. Preferably the bioremediation is performed before the water is passed through demineralizing filters to prolong the life of such filters. As a result, there is less radioactive waste to be managed, thereby increasing the profitability of the method.

9 Claims, No Drawings

BIOREMEDIATION METHOD WHICH IS USED TO CONCENTRATE AND ELIMINATE RADIONUCLIDES IN RADIOACTIVE WATER

PRIOR STATE OF THE ART

During the past few years, bioremediation procedures have been developed that consistently use microorganisms to recover contaminated environments. These efforts have been made mainly for land contaminated by chemical, toxic, or dangerous products using microorganisms. In this way, the bioremediation concept has begun to be implemented. However, the use of microorganisms to recover the environment has been known for more than seventy years in purifying wastewaters. Bioremediation procedures have also been applied to manage radioactive waste in repositories, but never in the containment area of a nuclear power plant, which is the object of the present patent.

The objective of the pools used to store the spent nuclear fuel is to cool down the spent fuel coming from the reactor that still contains high levels of radioactivity and generates a high quantity of heat. Despite the fact that the water in the nuclear pools acts as an efficient shield against radiation, the levels, which the employees working in the surrounding area are exposed to, are considerable. The purpose of the procedure which will be described is to lower the levels of radioactive contamination in the nuclear pools and, as a result, reduce the level of radiation surrounding them as well as the rate of exposure.

Currently, the radioactive water of the nuclear pools is treated with a system of demineralising filters made from ion-exchange resins whose goal is to retain the dissolved substances and those in suspension that can be found in the water, such fission and corrosion products, etc. so that the water is much clearer and the radioactivity in the area surrounding the pools is significantly lower. As time passes, the life expectancy of the resins is lowered and it is necessary to store them in drums and to treat them as radioactive waste. The following bioremediation procedure, however, retains the nucleotides found in the radioactive water before they reach the resin of the demineralising filters, and as a result, increase their life expectancy, thus reducing the volume of radioactive material to be managed. The material used for the procedure that is being patented, unlike the resins, can be decontaminated and managed as non-radioactive material.

DESCRIPTION OF THIS INVENTION

As previously mentioned, to concentrate and eliminate radionuclides from the radioactive water of nuclear pools, a completely innovative bioremediation procedure has been invented that is applied during the treatment of the water in the pools, before it is re-emptied into them.

In this procedure, the radioactive water from the nuclear pools under treatment, goes through a bioreactor that contains a metallic material, such as titanium or stainless steel, wound into a ball, or any other material that is non-corrosive or non-degradable in this environment and can be colonised by the microorganisms that exist in this type of water. As it goes through the bioreactor, the radioactive water to be treated comes into contact with the material of the ball placed inside, thus forming a biofilm that retains the radionuclides. The microorganisms are capable of retaining the radioisotopes present in the water of the pools by one or more of the following mechanisms: bioadsorption, bioabsorption, bioaccumulation, biosolubility, bioprecipitation.

The water then goes out from the opposite end of the continuous-flow entrance and, before going back into the pool, it goes through a system of demineralising filters.

Finally, the material of the bioreactor is replaced by fresh material. The biofilm that colonises the material and retains the radionuclides is economically eliminated by any conventional radiochemical decontamination procedure and the radionuclides can be concentrated in a small volume of eluent to be recuperated, completely disposed of, or contained. At this point, the material from the bioreactor can then be managed like non-radioactive material. Both processes, the concentration of radionuclides in a reduced volume and the management of the used materials as non-radioactive, contribute to the cost-effectiveness of the procedure.

The type and size of the bioreactor, the flow of the circulating radioactive water to be treated, and the periodicity of the elimination of the biofilm are conditioned depending on the specifications of each of the water-treatment plants found in the hot area of the different nuclear power plants.

The first objective of this procedure consists in taking advantage of the capacity that some microorganisms in the radioactive waters of the pools have in order to colonize the material placed inside the bioreactor. These microorganisms that cannot be cultured or manipulated in a laboratory are known in the technical bibliography as VBNC (viable but not culturable).

In order to accelerate the concentration of radionuclides, the other objective of this procedure consists in previously culturing the ball, or a similar device, in the presence of a microorganism or a mixture of these. The microorganisms would have to have been previously isolated from the radioactive water to be treated.

DETAILS OF THE EMBODIMENT

The first part of the procedure consists in preparing the material that will be placed inside the bioreactor. This material can be made, for example, from braided stainless steel wool and shaped into a 20-gram ball with a surface area of 0.01 $m^2 \cdot g^{-1}$. It is then degreased using acetone in an ultrasound bath and sterilised in an autoclave at 121° C. for 15 minutes. In aseptic conditions, the balls are then placed inside a stainless-steel cylindrical bioreactor that is 250-mm high and 90-mm in diameter. An entrance is placed at the bottom so that the water can enter, and an exit is placed at the top where the water can escape. The next step in this procedure consists in pumping an average of 3-cubic meters of radioactive water from a spent nuclear fuel pool per hour. The qualitative isotopic composition of the said water is usually $^{60}Co$, $^{137}Cs$, $^{134}Cs$, $^{65}Zn$, and $^{54}Mn$. As of this moment, the material inside the bioreactor begins to be colonised by the microorganisms present in the radioactive water and the radionuclides are retained. With this procedure, which is applied to a BWR (boiling-water reactor) type nuclear power plant as the one where the experimental prototype was carried out, it is possible first to concentrate and then to eliminate the $^{60}Co$ radionuclide.

The invention claimed is:
1. A method for bioremediation of water in the containment area of a nuclear power plant containing spent nuclear fuel comprising the steps of providing a bioreactor containing a metallic material capable of being colonized by viable but not culturable microorganisms found in said water and passing said water through said bioreactor to form a biofilm that retains radionuclides including 60-Co.

2. A method according to claim 1 wherein said step of providing a bioreactor comprises forming said metallic material into balls, degreasing said balls, sterilizing said balls, and placing said balls in said bioreactor.

3. A method according to claim 2 wherein the cross sectional area of said bioreactor is about 280 mm$^2$ and said step of passing said water through said bioreactor comprises pumping through said bioreactor an average of about three cubic meters of said water per hour.

4. A method according to claim 3 wherein said bioreactor is cylindrical and about 250 mm high.

5. A method according to claim 1 wherein said metallic material is non-corrosive or non-degradable.

6. A method according to claim 5 wherein said metallic material is made of a material selected from the group consisting of stainless steel and titanium.

7. A method according to claim 6 wherein said metallic material is formed into balls.

8. A method according to claim 1 wherein said metallic material is also capable of being colonized by culturable microorganisms.

9. A method according to claim 1 wherein said step of passing said water through said bioreactor comprises passing said water though said bioreactor in a continuous flow.

* * * * *